United States Patent
Kacewicz

(10) Patent No.: US 9,470,068 B2
(45) Date of Patent: Oct. 18, 2016

(54) METHODS AND SYSTEMS FOR HISTORICAL, GEOLOGICAL MODELING TO PRODUCE AN ESTIMATED DISTRIBUTION OF HYDROCARBONS TRAPPED IN SUBSURFACE CLATHRATES

(71) Applicant: Marek Kacewicz, Sugarland, TX (US)

(72) Inventor: Marek Kacewicz, Sugarland, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 573 days.

(21) Appl. No.: 14/012,925

(22) Filed: Aug. 28, 2013

(65) Prior Publication Data

US 2015/0066461 A1 Mar. 5, 2015

(51) Int. Cl.
*G06G 7/48* (2006.01)
*E21B 43/00* (2006.01)
*G01V 99/00* (2009.01)

(52) U.S. Cl.
CPC ............. *E21B 43/00* (2013.01); *G01V 99/005* (2013.01)

(58) Field of Classification Search
CPC ............................ E21B 43/00; G01V 99/005
USPC .......................................................... 703/10
See application file for complete search history.

(56) References Cited

PUBLICATIONS

M. Haeckel et al.: "3-D Numerical Modelling of Gas Hydrate Accumulations at the Alaska North Slope", EAGE Conference Proceedings, 13 June 2813 (2813-86-13), XP888174357. Submitted in IDS dated Feb. 26, 2016.*

International Search Report from corresponding application PCT/US2014/032671, mailed Jan. 30, 2015.
Haeckel, M. et al., "3-D Numerical Modeling of Gas Hydrate Accumulations at the Alaska North Slope", 75th EAGE Conference and Exhibition Incorporating SPE EUROPEC 2013, London, UK Jun. 10-13, 2013, pp. 17-21.
Pinero, E. et al., "3-D Numerical Modeling of Methane Hydrate Deposits", Proceedings of the 7th International Conference on Gas Hydrates (ICGH 2011), Edinburgh, Scotland, UK, Jul. 17-21, 2011. http://www.pet.hw.ac.uk/icgh7/papers/icgh2011Final00279.pdf.
Heng-Joo Ng and Donald B. Robinson "The Measurement and Prediction of Hydrate Formation in Liquid Hydrocarbon-Water Systems", Ind. Eng. Chem., Fundam., vol. 15, No. 4 (1976) pp. 293-298.

(Continued)

*Primary Examiner* — Saif Alhija
(74) *Attorney, Agent, or Firm* — Andy Lagatta; Marie L. Clapp

(57) ABSTRACT

Methods and systems for historical, geological modeling for producing an estimated distribution of hydrocarbons trapped in subsurface clathrates are disclosed. One method includes instantiating a basin model of a geological area of interest, and, for each of a plurality of predetermined geological times up to a geologic present day: determining one or more changes to the basin model, calculating, at each of a plurality of locations within the basin model, a temperature and a pressure, determining an existence and a location of a clathrate stability zone based on the calculated temperatures and pressures, and estimating one or more clathrate concentrations and hydrocarbon volumes in the clathrate stability zone. The method further includes calibrating a present day clathrate concentration and hydrocarbon volume derived from the basin model against calibration data obtained from one or more locations within the geological area of interest, thereby providing a model of the present day clathrate concentration and hydrocarbon volume at each of the plurality of locations.

19 Claims, 6 Drawing Sheets

(56) References Cited

PUBLICATIONS

Higley, Debra K., et al., "Petroleum Systems Modeling Capabilities for Use in Oil and Gas Resource Assessments", USGS, Open-File Report 2006-1024, Jan. 1, 2006. http://pubs.usgs.gov/of/2006/pdf/OFR-2006-1024.pdf.
Sloan, E.D., 2008, Clathrate Hydrates of Natural Gases, 3rd Edition, Taylor & Francis, 721 pages.
Max, D., 2003, Natural Gas Hydrate in Oceanic and Permafrost Environments, Kluwer Academic Publishers, Dordrecht, Netherlands, 414 pages.
Daigle, H, et al., 2011, Transient hydraulic fracturing and gas release in methane hydrate settings: A case study from southern Hydrate Ridge, Geochem. Geophys. Geosyst., V.12, No. 12, p. 1-15.
Daigle, H., Dugan, B., 2011, Capillary controls on methane hydrate distribution and fracturing in advective systems, Geochem. Geophys. Geosyst., V.12, No. 1, p. 1-18.
Kvenvolden, K.A., 1993, Gas hydrates—Geological Perspective and Global Change, Reviews of Geophysics, 31, 2, p. 173-187.
Behseresht, J., Bryant, S. L., 2011, Sedimentological and transport control on hydrate saturation distribution in Arctic gas-hydrate-bearing deposits, Proc. 7th Int. Conf. on Gas Hydrates, ICGH, Edinburgh, Jul. 17-21, Abstract.
Spence, G.D., et al., 2010, Seismic Indicators of Natural Gas Hydrate and Underlying Free Gas, in: Geophysical Characterization of Gas Hydrates, eds: Riedel, M, Willoughby, E. C., Chopra,S., SEG Geophysical Developments, No. 14, p. 39-71.
Chen, M-A., P., et al., 2010, Seismic AVO for gas-hydrate-related Reflections, in: Geophysical Characterization of Gas Hydrates, eds: Riedel, M, Willoughby, E. C., Chopra, S., SEG Geophysical Developments, No. 14, p. 73-93.
Riedel, M, et al., 2010, Inversion of Seismic Data for Elastic parameters: A Tool for Gas-hydrate Characterization, in: Geophysical Characterization of Gas Hydrates, eds: Riedel, M, Willoughby, E. C., Chopra, S., SEG Geophysical Developments, No. 14, p. 109-120.
Edwards, R. N., 2010, Marine Controlled-source Electromagnetics and the Assessment of Seafloor Gas Hydrate, in: Geophysical Characterization of Gas Hydrates, eds: Riedel, M, Willoughby, E. C., Chopra, S., SEG Geophysical Developments, No. 14, p. 149-162.
Goldberg, D. S., 2010, Evaluation of Natural Gas-hydrate Systems Using Borehole Logs, in: Geophysical Characterization of Gas Hydrates, eds: Riedel, M, Willoughby, E. C., Chopra, S., SEG Geophysical Developments, No. 14, 239-261.
Lee, M.F., and Waite, Estimating pore-space gas hydrate saturations from well log acoustic data, Geochem. Geophys. Geosyst., V.9, No. 7, p. 1-8.
Kleinberg, R.L., et al., Magnetic resonance log of JAPEX/JNOC/GSC et al. Mallik 5L-38 gas hydrate production research well: Gas Hydrate Saturation, growth habit, relative permeability, in: Scientific Results From Mallik 2002 Gas Hydrate Production Research Well program, Makenzie Delta, Northwest Territories, Canada, eds: Dallimore, S.R., and Collett, Bull. Geol. Surv. Can., 585, p. 1-10.
Hantschel, Th., Kauerauf, A.,I., Fundamentals of Basin and Petroleum Systems Modeling, , Springer Verlag Berlin Heidelberg, 2009, p. 1-29.
Rice, D. D., Claypool, G. E., Generation, Accumulation, and Resource Potential of Biogenic Gas, AAPG Bulletin, Jan. 1981, v. 65, p. 5-25.
Fjellanger, E., et al., Charging the giant gas fields of the NW Siberia basin, The Geological Society of London, Petroleum Geology Conference series, 2010, v.7, p. 659-668.
Fleet, A. J., et al., 1998, Large volumes of carbon dioxide in sedimentary basins,Goldschmidt Conference Toulouse 1998, Minearalogical Magazine, V.62A, p. 460-461.
Clayton, J. L., Spencer, C. W., Koncz, I., Szalay, A., 1990. Origin and migration of hydrocarbon gases and carbon dioxide, Bekes Basin, Southeastern Hungary. Organic Geochemistry V. 15, p. 233-247.
Schoell, M., 1983. Genetic characterization of natural gases. AAPG Bulletin, V. 67 No. 21, p. 2225-2238.
Sherwood-Lollar, B., Ballentine, C. J., O'Nions, R. K., 1997. The fate of mantle-derived carbon in a continental sedimentary basin: integration of C/He relationships and stable isotope signatures. Geochimica et Cosmochimica Acta V. 61, p. 2295-2307.
Poreda, R. J., Jeffrey, A. W. A., Kaplan, I. R., Craig, H., 1988. Magmatic Helium in subduction-zone natural gases. Chemical Geology V. 71, p. 199-210.
Machel, H. G., Krouse, H. R., Sassen, R., 1995. Products and distinguishing criteria of bacterial and thermochemical sulfate reduction. Applied Geochemistry V. 10, p. 373-389.
Katsube, T. J., et al., 2005, Seal mechanisms in shallow sediments: implications for shallow-water flow and gas-hydrate hazards, Search and Discovery (poster).

* cited by examiner

METHODS AND SYSTEMS FOR HISTORICAL, GEOLOGICAL MODELING TO PRODUCE AN ESTIMATED DISTRIBUTION OF HYDROCARBONS TRAPPED IN SUBSURFACE CLATHRATES

TECHNICAL FIELD

The present disclosure relates generally to estimating a presence of clathrates in a subsurface environment. In particular, the present disclosure relates to use of historical, geological modeling to produce an estimated distribution of hydrocarbons trapped in subsurface clathrates.

BACKGROUND

"Clathrates" generally refer to non-stoichiometric metastable substances in which lattice structures composed of first molecular components (host molecules) trap or encage one or more other molecular components (guest molecules) in what resembles a crystal-like structure. Clathrates are sometimes referred to as inclusion compounds, hydrates, gas hydrates, methane hydrates, natural gas hydrates, $CO_2$ hydrates and the like. Example properties of such clathrates are described, for example, in Sloan, E. D., 2008, Clathrate Hydrates of Natural Gases, $3^{rd}$ Edition, Taylor & Francis, as well as in Daigle, H., Dugan, B., 2011, Capillary controls on methane hydrate distribution and fracturing in advective systems, Geochem. Geophys. Geosyst., V. 12, No. 1.

In the field of hydrocarbon exploration and development, clathrates are of particular interest. For example, clathrates exist in which water host molecule lattices encage one or more types of hydrocarbon guest molecule(s). Such hydrocarbon-capturing clathrates occur naturally in environments of relatively low temperature and high pressure where water and hydrocarbon molecules are present, such as in deepwater and permafrost sediments. Clathrates at lower temperatures remain stable at lower pressures, and conversely clathrates at higher temperatures require higher pressures to remain stable. Generally, and as noted in Sloan, above, clathrate formation is a complex dynamic process that occurs in specific geologic and pressure/temperature (P/T) conditions over geologic time.

Hydrocarbons and other gases trapped in clathrates are of biogenic and/or thermogenic origin. Generation of thermogenic and biogenic gases is described in numerous articles and textbooks. Examples of such literature include: Rice, D. D., Claypool, G. E., Generation, Accumulation, and Resource Potential of Biogenic Gas, AAPG Bulletin, January 1981, v. 65, p. 5-25; Fjellanger, E., et al., Charging the giant gas fields of the NW Siberia basin, The Geological Society of London, Petroleum Geology Conference series, 2010, v. 7, p659-668; and Hantschel, Th., Kauerauf, A., I., Fundamental of Basin and petroleum Systems Modeling, Springer Verlag Berlin Heidelberg, 2009, p. 151-340. Clathrates that have a biogenic isotopic signature are formed from gases that migrate over relatively short distances into a zone where temperature and pressure conditions support formation of clathrates, referred to as a clathrate stability zone ("CSZ"). Clathrates that have a thermogenic isotopic signature are formed from thermogenically generated gases that typically migrate upwards into the CSZ from mature source rocks over geologic time. Mixed origin clathrates contain isotopic signatures of both biogenic and thermogenic gases.

In addition to hydrocarbon gases, clathrates may encapsulate non-hydrocarbon gases such as $CO_2$ and $H_2S$. $CO_2$, $H_2S$ formation in subsurface locations is described in further detail in a number of publications, for example in Fleet, A. J., et al., 1998, Large volumes of $CO_2$ in sedimentary basins, Goldschmidt Conference Toulouse 1998, Mineralogical Magazine, V.62A, p. 460-461.

In general, clathrates are formed under poor to moderate seals in shallow sediments. Furthermore, once formed, clathrates serve as an additional seal that traps free hydrocarbons, thereby preventing additional free hydrocarbons from rising through the formed clathrates. This may either promote further clathrate formation, or may trap free gas at or below the CSZ, or may cause the free hydrocarbon gases to relocate in order to rise through the permeable portion of CSZ. Furthermore, gases trapped in clathrates are freed once the sealing location is buried deeper, thereby leaving the CSZ due to increased temperature and/or pressure. These released gases may again migrate to the surface and either (1) be lost or (2) contribute to new hydrates being formed at shallower locations within the CSZ. As such, the presence and distribution of clathrates, and in particular clathrates that encapsulate hydrocarbons, is dynamic over time, as changes to locations of clathrates, free gas, and CSZs occur.

Typical analysis of clathrates focuses on present day clathrate stability zones (e.g., as described in Sloan, above), which correspond to the current subsurface locations where temperature and pressure conditions would support clathrate formation. However, such analysis has drawbacks. For example, relying on current temperature and pressure conditions ignores the above-described dynamic aspect of hydrocarbon generation and charge, and the formation and destruction of clathrates as a function of changing PVT (pressure/volume/temperature) conditions due to geologic changes, such as burial or uplift. This may lead to misestimation of the type, location, and saturation of various hydrocarbon or non-hydrocarbon gases in the CSZ. Inaccurate estimation of the types and locations of hydrocarbons trapped in clathrates can result in an incomplete analysis and failure to identify economically attractive hydrocarbon-rich clathrate deposits. It could also result in attempted harvesting of clathrates from locations that appear to have high hydrocarbon concentrations, but in fact contain clathrates that encapsulate non-hydrocarbon gases, such as $CO_2$ or $H_2S$. This can result in selection of locations for clathrate harvesting that are at best unproductive, and at worst dangerous.

Accordingly, improvements in such existing analyses are desired.

SUMMARY

In accordance with the following disclosure, the above and other issues are addressed by the following:

In a first aspect, a method for historical, geological modeling for producing an estimated distribution of hydrocarbons trapped in subsurface clathrates are disclosed. The method includes instantiating a basin model of a geological area of interest, and, for each of a plurality of predetermined geological times up to a geologic present day: determining one or more changes to the basin model, calculating, at each of a plurality of locations within the basin model, a temperature and a pressure, determining an existence and a location of a clathrate stability zone based on the calculated temperatures and pressures, and estimating one or more clathrate concentrations and hydrocarbon volumes in the clathrate stability zone. The method further includes calibrating a present day clathrate concentration and hydrocarbon volume derived from the basin model against calibration data obtained from one or more locations within the geological area of interest, thereby providing a model of the present day clathrate concentration and hydrocarbon volume at each of the plurality of locations.

In a second aspect, a system for historical, geological modeling for producing an estimated distribution of hydrocarbons trapped in subsurface clathrates is disclosed. The system includes a basin modeling component configured to model one or more changes to a geological area of interest at each of a plurality of predetermined geological times up to a geologic present day in a basin model. The system also includes a clathrate calculation component interfaced to the basin modeling component and configured to, for each of the plurality of predetermined geological times: calculate, at each of a plurality of locations within the basin model, a temperature and a pressure; determine an existence and location of a clathrate stability zone based on the calculated temperatures and pressures; and estimate one or more clathrate concentrations and hydrocarbon volumes in the clathrate stability zone. The system further includes a calibration component configured to calibrate a present day clathrate concentration and hydrocarbon volume derived by the clathrate calculation component from the basin model against calibration data obtained from one or more locations within the geological area of interest, thereby providing a model of the present day clathrate concentration and hydrocarbon volume at each of the plurality of locations.

In a third aspect, a computer-readable storage medium comprising computer-executable instructions stored thereon is disclosed. The computer-executable instructions, when executed by a computing system, cause the computing system to perform a method of historical, geological modeling for producing an estimated distribution of hydrocarbons trapped in subsurface clathrates. The method includes instantiating a basin model of a geological area of interest, the basin model including a suite of three-dimensional maps defining an assimilation of known information about a geographical region. The method further includes, for each of a plurality of predetermined geological times up to a geologic present day: determining one or more changes to the basin model; calculating, at each of a plurality of locations within the basin model, a temperature and a pressure; determining an existence and location of a clathrate stability zone based on the calculated temperatures and pressures; estimating one or more clathrate concentrations and hydrocarbon volumes in the clathrate stability zone; and computing an existence of non-hydrocarbon gases held in clathrates in the clathrate stability zone. The method also includes calibrating a present day clathrate concentration and hydrocarbon volume derived from the basin model against calibration data obtained from one or more locations within the geological area of interest, thereby providing a model of the present day clathrate concentration and hydrocarbon volume at each of the plurality of locations. The method includes outputting an independent indication of an existence and saturation percentage of clathrates at one or more locations within the geological area of interest at geologic present day.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

As briefly described above, embodiments of the present invention are directed to methods and systems for detecting the presence and saturation of clathrates, such as methane hydrates, in an underground, or subsurface, location. In particular, the methods and systems discussed herein provide for overall methods and systems that provide a more complete analysis of clathrate formation by considering both thermogenic and biogenic gas generation through geologic time.

As further discussed below, the methods and systems of the present disclosure integrate clathrate analysis with basin modeling. Accordingly, this analysis accounts for both thermogenic and biogenic gas generation and migration, oil to gas cracking as well as the temporal aspect of changes to hydrocarbon distributions that may become trapped in clathrates over geologic time. In addition, the methods and systems of the present disclosure address rock property change due to clathrate generation, such as formation of clathrate seal, changes to porosity and/or permeability, or changes to capillary pressure.

For the purposes of this disclosure, the term "clathrate" will include any and all types of lattice (host) molecule(s) and any and all types of encaged (guest) molecule(s) in all possible combinations. Clathrates can include, for example, transitions between various clathrate lattice structure types; formation, stable state and dissociation, and the substitution of one or more type(s) of molecule by one or more other type(s) of molecule.

Figure 1:
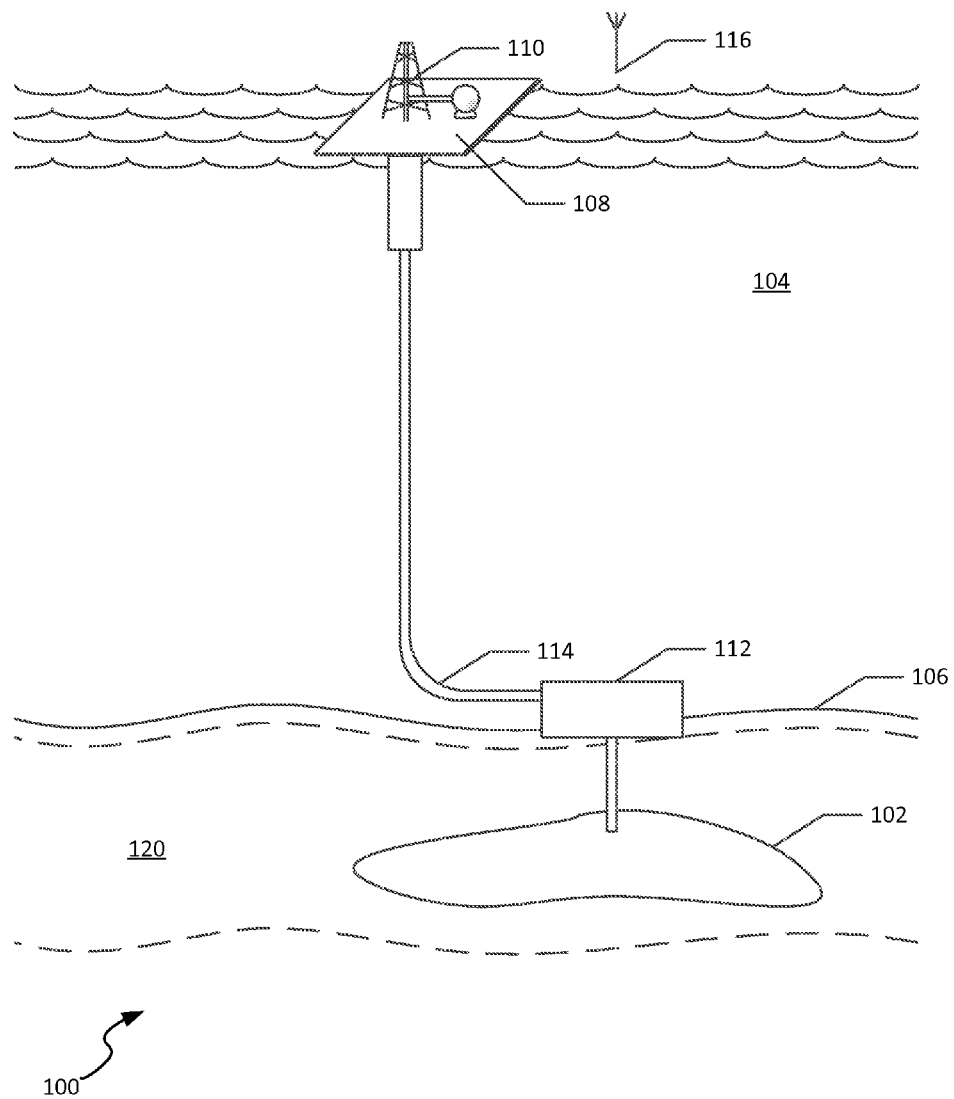
FIG. 1 is a schematic illustration of an offshore hydrocarbon production system including a production facility which receives and processes hydrocarbons from one or more clathrate reservoirs.

FIG. 1 is a schematic drawing of an example embodiment of an offshore or deepwater hydrocarbon production system 100. System 100 includes a clathrate reservoir 102 disposed beneath sea water 104 and seafloor 106. This clathrate reservoir 102 produces water and hydrocarbons, primarily natural gas. In the embodiment shown, an offshore platform 108 supports a production facility 110, which is used to at least partially separate liquids, water and/or oil, from natural gas.

In this example embodiment, the clathrate reservoir 102 is shown in fluid communication with a subsea well 112 which, in turn, is connected to production facility 110 by way of tieback 114. Clathrate reservoir 102 primarily produces a mixture of natural gas and water which is delivered to production facility 110 for separation of natural gas and water, and oil if there are significant amounts of oil contained within the mixture.

In the embodiment shown in FIG. 1, a wave generation and detection system 116 can be used prior to installation of the overall hydrocarbon production system 100, and can be used to locate the system 100 at a particular location along the seafloor 106. The wave generation and detection system 116 can be, for example a seismic or other acoustic wave generation system, or other system capable of generating waves that are able to penetrate the sea water 104 and seafloor 106, and to capture reflected waves, and thereby detect differences in the media through which the waves travel based on speed of travel. Accordingly, a potential presence of clathrates may be detected by direct observation (e.g., at a well site) or by observation of present day implicit characteristics, such as seismic or acoustic data.

It is noted that the production system 100 shown in FIG. 1 is only an exemplary illustration of a hydrocarbon production system. Those skilled in the art will appreciate that it is within the scope of the present invention to provide a hydrocarbon production system that combines multiple such clathrate reservoirs and associated wells, or combination of such a clathrate reservoir and associated well with conventional hydrocarbon reservoir and well systems.

Figure 2:
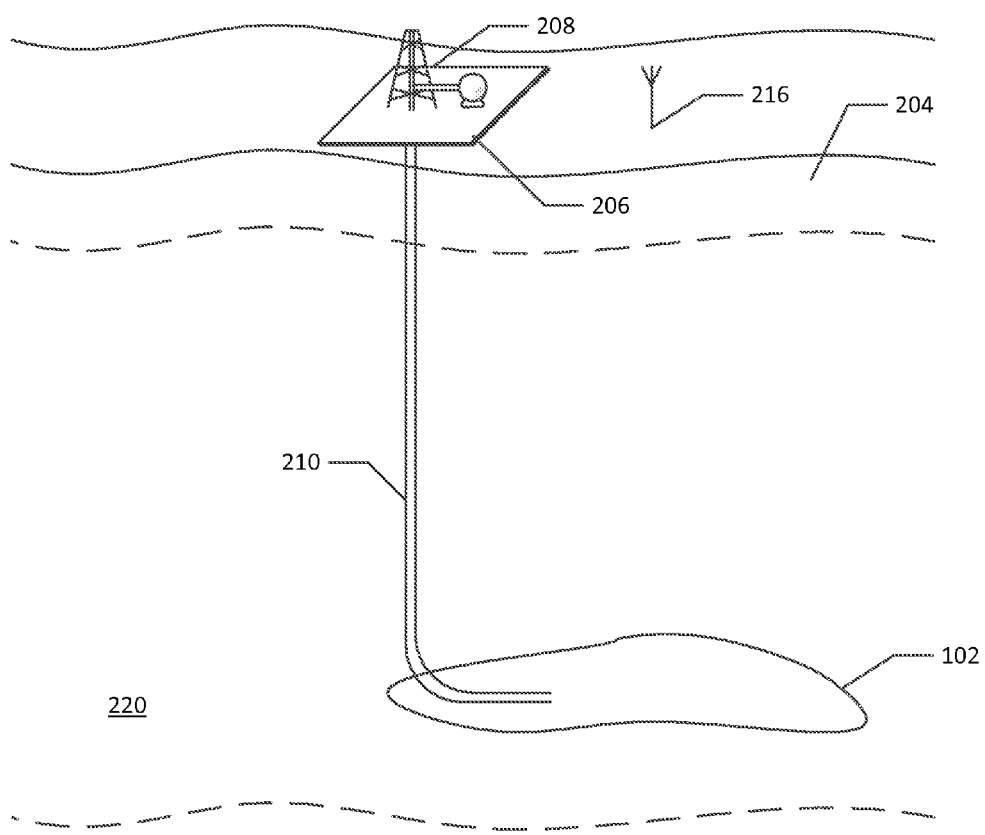
FIG. 2 is a schematic illustration of an onshore hydrocarbon production system including a production facility which receives and processes hydrocarbons from one or more clathrate reservoirs.

FIG. 2 is a schematic drawing of another exemplary embodiment of a hydrocarbon production system 200 which, in this case, is located on land rather than being based offshore. Production system 200 includes a clathrate reservoir 202. Disposed upon a permafrost layer 204 is an arctic platform 206. A production facility 208, generally similar to production system 110, is located atop arctic platform 206. Production facility 208 is used to separate and process natural gas, oil and water received from the clathrate reservoir 202. Production tubing 210 is used to fluidly convey a mixture of clathrates and water from clathrate reservoir 202 to arctic platform 206 and production facility 208. The mixture may include, in some cases, a small portion of oil.

As with the hydrocarbon production system 100 of FIG. 1, it is noted that in the context of the on-land arrangement of FIG. 2, a wave generation and detection system 216, analogous to system 116 of FIG. 1, can be used prior to installation of the overall hydrocarbon production system 200, and can be used to locate the production system 200 at a particular location. The wave generation and detection system 216 can include any of a variety of types of seismic, acoustic, or other system capable of generating waves that are able to penetrate the permafrost layer 204, and to capture reflected waves, and thereby detect differences in the media through which the waves travel based on speed of travel. It is noted that, in the example of FIG. 2, there are likely to be greater variations in densities at shallower depths, based on the comparative uniformity of sea water as compared to variations found in the on-land subsurface sediments. In either case, such data can be captured for use in some embodiments of the present disclosure, as discussed in further depth below.

Generally, locations are selected for installation of the hydrocarbon production systems 100, 200 of FIGS. 1-2 based at least in part on current, known data. This can include, for example, data collected from prior hydrocarbon harvesting operations, as well as data collected from seismic or acoustic logs, such as may be generated using a wave generation and detection system 116, 216 as illustrated above. As is discussed further below, this observed and interpreted data can be used to validate, or calibrate, a geologic model that estimates the presence of such hydrocarbons by considering various sources for such hydrocarbons, as well as changes that occur over geologic time to a hydrate stability zone in which clathrates may occur.

Furthermore, it is noted that clathrate reservoirs 102, 202 of FIGS. 1-2 are formed within a present-day clathrate stability zone ("CSZ"), shown as CSZ 120, 220 respectively. The present-day CSZ corresponds to a current area in which temperatures are sufficiently low and pressures sufficiently high to form clathrates. Above the CSZ, pressures are insufficient to form such clathrates, and temperatures may also be too high; below the CSZ, the temperatures and pressures continue to increase, such that clathrates will also not form at those locations (e.g., due to insufficiently low temperatures). Accordingly, although the CSZ remains at a generally shallow subsurface depth, it is noted that, in view of geological changes over time (e.g., burial, uplift, etc.) the specific portions of subsurface sediment that may contain clathrates and reside within a CSZ at a particular geologic time may be outside of the CSZ, and may consequently release those clathrates, at a different geologic time.

In accordance with the present disclosure, prediction of the location of clathrate reservoirs 102, 202 is provided by way of considering both thermogenic and biogenic gas generation over the course of geologic time. Additionally, porosity and permeability changes can also be tracked with respect to existing formed clathrate structures, thereby allowing more accurate, fully-formed modeling of clathrate formation.

Figure 3:
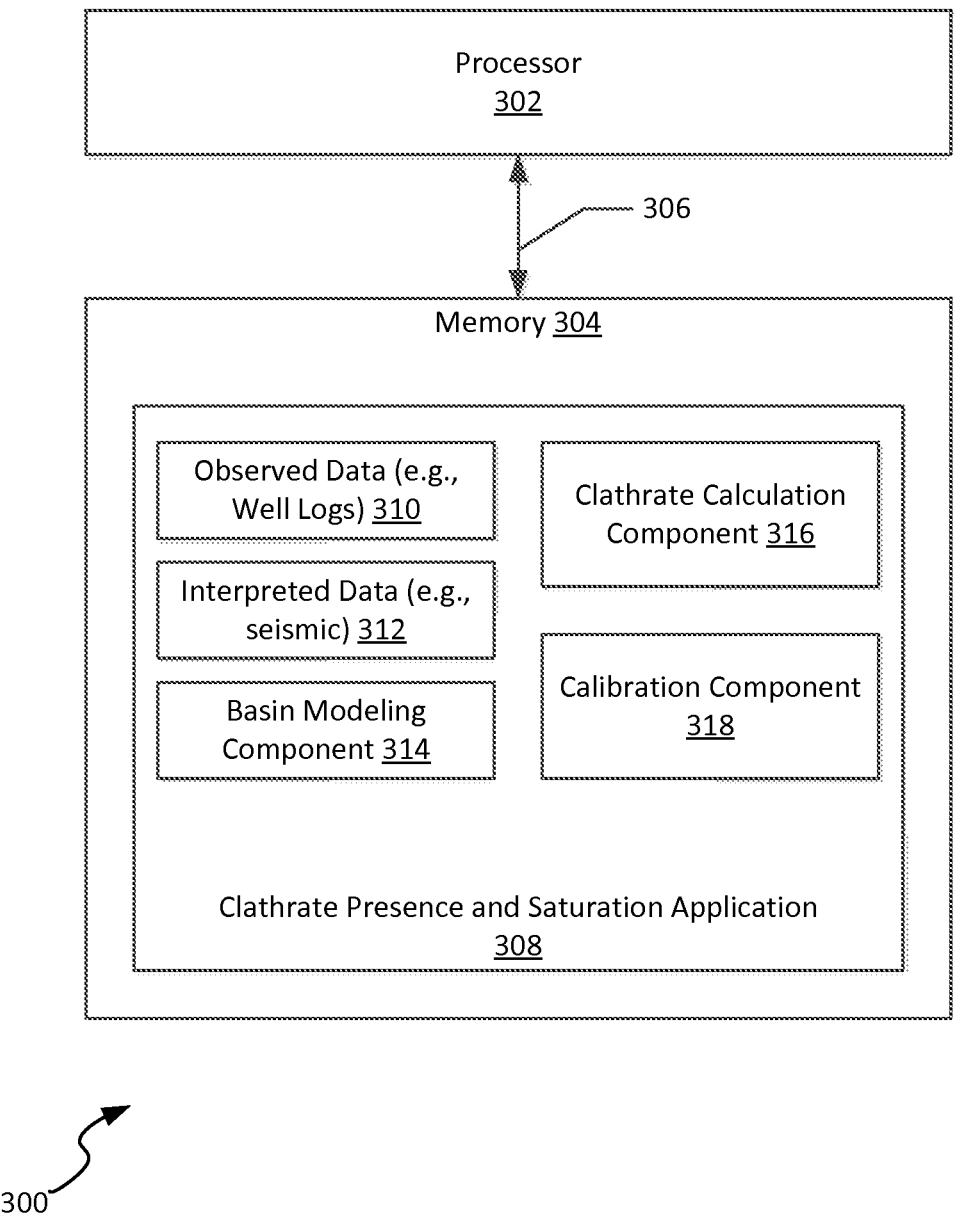
FIG. 3 is a schematic illustration of a computing system in which historical, geological modeling can be performed to produce an estimated distribution of hydrocarbons trapped in subsurface clathrates, according to an example embodiment.

Referring now to FIG. 3, an example computing system 300 is illustrated in which historical, geological modeling can be performed to produce an estimated distribution of hydrocarbons trapped in subsurface clathrates, such as can be used to select a high-saturation area in which locate a production system such as those shown in FIGS. 1-2. A thorough analysis based on an understanding of processes that lead to hydrocarbon and non-hydrocarbon gas formation and modeling of gas formation and migration over geologic time, as performed by computing system 300 and as discussed further below in connection with flowcharts of FIGS. 4-6, assists in identifying thermogenic, biogenic and non-hydrocarbon gases (or mixes) encapsulated in clathrates in a specific subsurface location.

In general, the computing system 300 includes a processor 302 communicatively connected to a memory 304 via a data bus 306. The processor 302 can be any of a variety of types of programmable circuits capable of executing computer-readable instructions to perform various tasks, such as mathematical and communication tasks.

The memory 304 can include any of a variety of memory devices, such as using various types of computer-readable or computer storage media. A computer storage medium or computer-readable medium may be any medium that can contain or store the program for use by or in connection with the instruction execution system, apparatus, or device. In the embodiment shown, the memory 304 stores a clathrate presence and saturation determination application 308. The application 308 includes a plurality of data collections, including observed data 310 and interpreted data 312, as well as a plurality of processing components, such as a basin modeling component 314, a clathrate calculation component 316, and a calibration component 318.

The observed data 310 and interpreted data 312 correspond to current knowledge regarding the presence or absence of clathrates in a particular area. For example, the observed data 310 can include well logs including information regarding actual clathrates and clathrate saturations that are encountered, as well as types of hydrocarbons or other gases captured by such clathrates. The interpreted data 312 corresponds, similarly, to data captured in the geological "present" (i.e., currently or in the near past), and can for example include seismic, acoustic, or other data, such as data that can be collected via the wave generation and detection systems 116, 216 of FIGS. 1-2. Other embodiments, or types of data, could be calculated, tracked, or observed as well.

In the embodiment shown, the basin modeling component 314 stores a basin model for a particular area of interest, and includes information regarding basin model intermediate results. These intermediate results can include, but are not limited to, burial depth, porosity, permeability, pore pressure, temperature, gas and water saturations, etc. over geologic time. For example, the basin modeling component 314 may be configured to store data associated with the Gulf of Mexico, and includes information regarding changes in water and burial depth over time such that changes to the subsurface geometry, connectivity and subsurface position of source rocks, migration fairways, seals and potential clathrate reservoirs of the Gulf can be simulated. This includes, for example, a level of or rate of biogenic gas formation and/or thermogenic gas formation, as well as a predetermined rate of change of various aspects of the basin model. It can also include physical particle compression as changes in pressure and temperature change at each location. Example of traditional basin modeling software packages that can be incorporated into, or utilized in conjunction with clathrate presence and saturation determination application 308 include but are not limited to: the Petromod Petroleum Systems Modeling software provided by Schlumberger Ltd. Of Houston, Tex. and Paris, France, the Temisflow software, or other software within the OpenFlow Suite provided by Beicip-Franlab of Rueil-Malmaison, France and Permedia Petroleum Systems Software provided by Halliburton Company of Houston, Tex.

In some cases, for example, the basin model can be set to have a predetermined change once every few million years, or in other cases, the basin model can experience a change every few hundred to thousand years. Specifics relating to the timing of the basin model updates are dependent upon the particular region being modeled, the rate of change of that modeled location, and other factors.

In the embodiment shown, the clathrate calculation component 316 is configured to interact with the basin modeling component 314, and receives access to the basin model at each geologic time segment, as well as for computation (often at intervals shorter than geologic time segments). The clathrate calculation component 316 can, in such embodiments, calculate pressures and temperatures at each point within the geological model at that particular time, and as such can calculate a location and a thickness of a clathrate stability zone at that time. Furthermore, the clathrate calculation component can, in some embodiments, determine based on the basin model described above, determine an amount of hydrocarbons, either from a biogenic or thermogenic source, which resides within the clathrate stability zone, and therefore which potentially forms a source of hydrocarbons trapped in clathrate formations in the CSZ. The calculations made in calculation component 316 are described in more detail below.

In some embodiments, the clathrate calculation component 316 can further be configured to compute levels of non-hydrocarbon gases present within the CSZ, for example such that it can be determined whether clathrates in the CSZ trap non-hydrocarbon gasses in the CSZ. Additionally, the clathrate calculation component 316 can be configured to model formation of clathrates from free gas at the current or a past geologic time period. Once that modeling is performed, the clathrate calculation component 316 can also compute a volume of hydrocarbon case trapped in clathrates to determine a worth for harvesting efforts at a particular location in the basin model.

In the embodiment shown, the calibration component 318 compares the final calculations from the clathrate calculation component 316 (i.e., the calculation by the clathrate calculation component 316 at the geologic present time) to observed data 310 and interpreted data 312 to calibrate the computations performed by the clathrate calculation component 316. This can include comparison to calibration data, which can include observed data 310, and can optionally include comparison to interpreted data 312 as a further assessment of the accuracy of the clathrate distributions calculated by clathrate calculation component 316 relative to the basin model managed by the basin modeling component 314.

Figure 4:
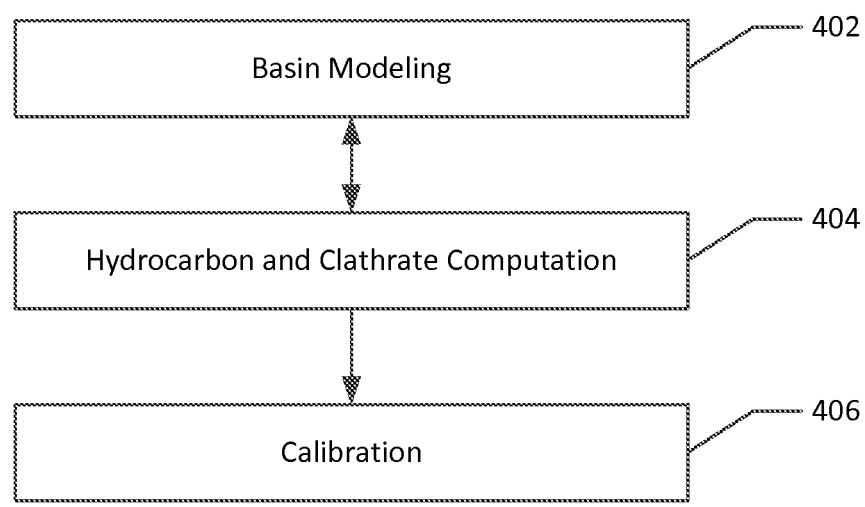
FIG. 4 is a flowchart illustrating a method for historical, geological modeling can be performed to produce an estimated distribution of hydrocarbons trapped in subsurface clathrates, in an example embodiment.
Figure 5:
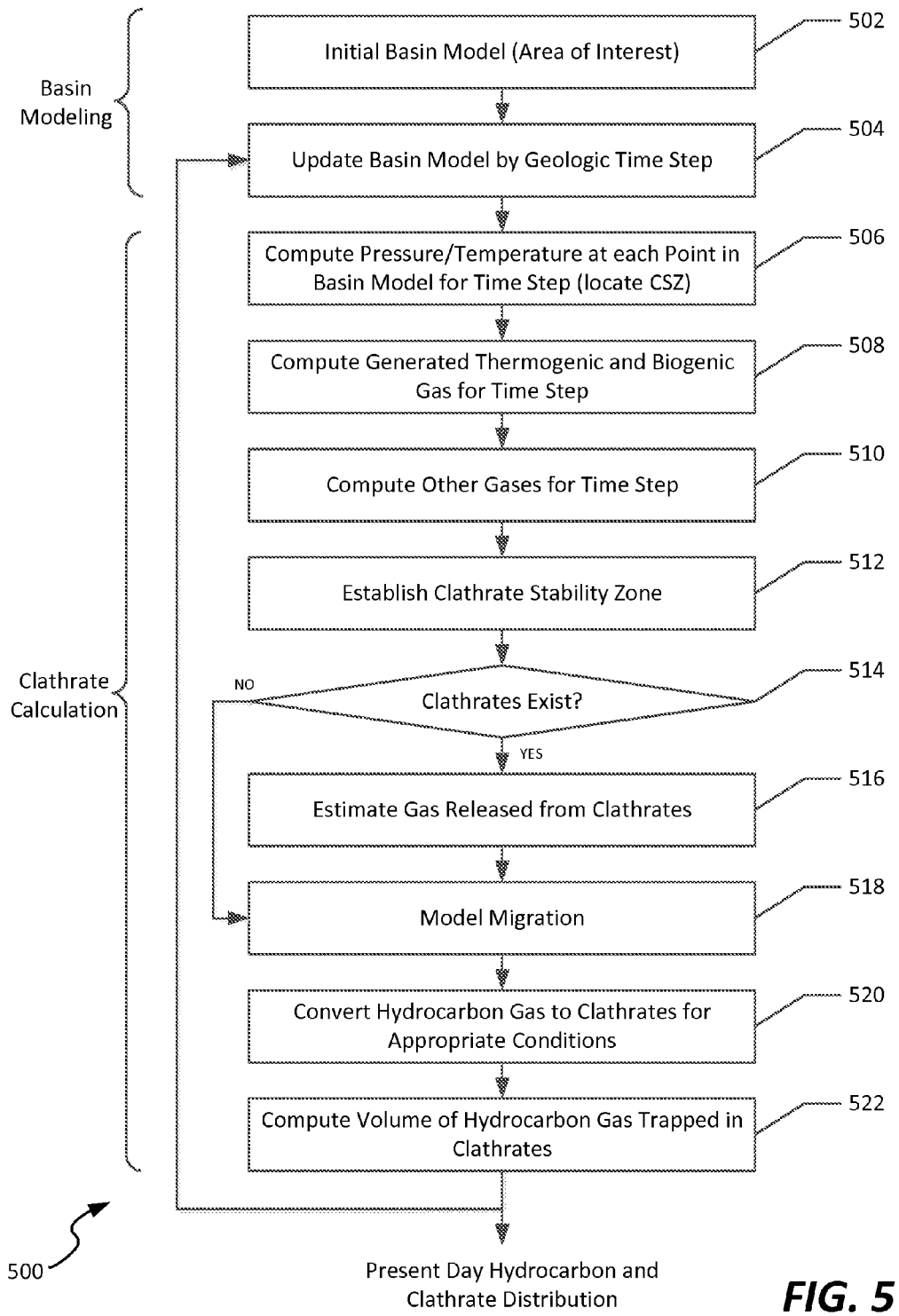
FIG. 5 is a flowchart illustrating a detailed method for historical, geological modeling can be performed to produce an estimated distribution of hydrocarbons trapped in subsurface clathrates, in an example embodiment.
Figure 6:
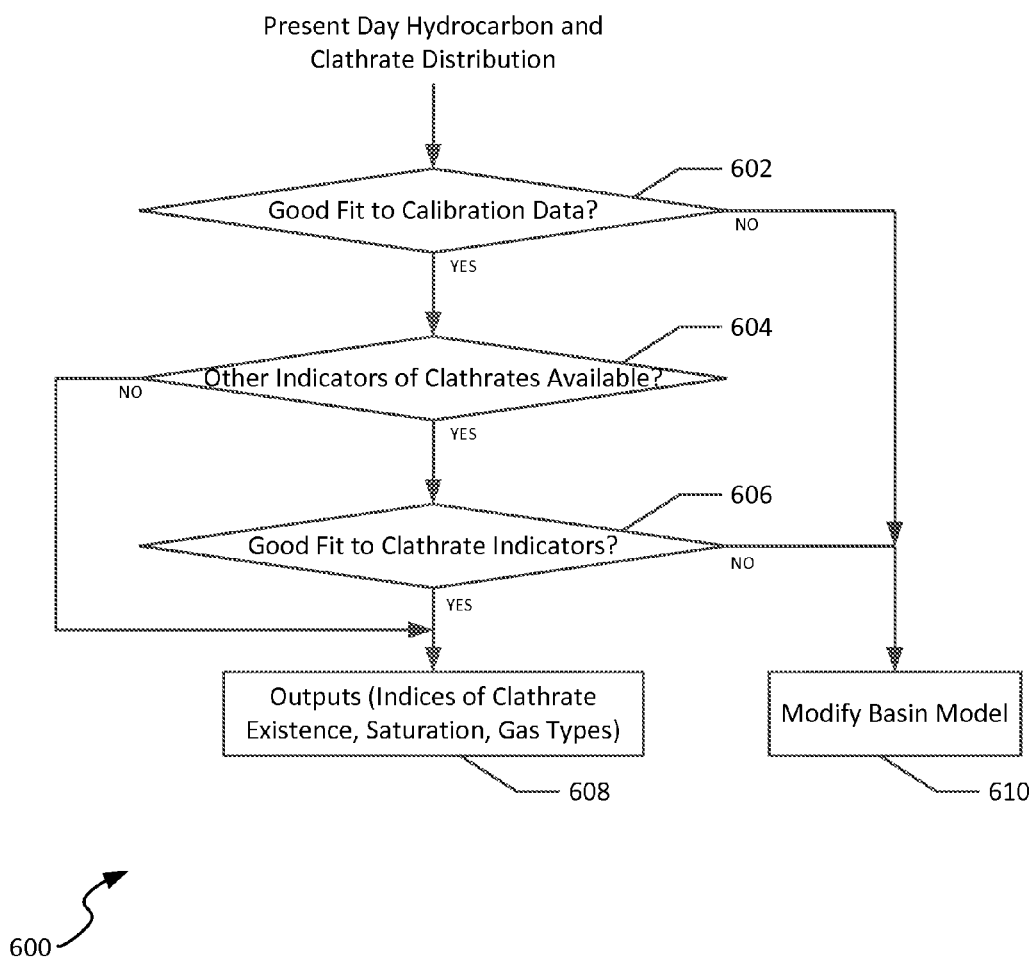
FIG. 6 is a flowchart illustrating a method for calibrating a modeled presence and saturation of clathrates as illustrated in FIG. 5, in an example embodiment.

In some embodiments, the basin modeling component 314, clathrate calculation component 316, and calibration component 318 can cooperate to perform a method in which historical, geological modeling can be performed to produce an estimated distribution of hydrocarbons trapped in subsurface clathrates, examples of which are illustrated in FIGS. 4-6, discussed below. Furthermore, in some embodiments the basin modeling component 314, clathrate calculation component 316, and calibration component 318 can be performed by combined software modules or separate software modules distributed across one or more than one computing systems. In still further embodiments, operations of the basin modeling component 314, clathrate calculation component 316, and calibration component 318 can be intercombined within the application, thereby allowing any of the various components to perform the processes described herein.

Referring now to FIG. 4, a method 400 in which historical, geological modeling can be performed to produce an estimated distribution of hydrocarbons trapped in subsurface clathrates is illustrated, in an example embodiment of the present disclosure. In the embodiment shown, the method 400 includes a basin modeling operation 402, a clathrate calculation operation 404, and a calibration operation 406.

The basin modeling operation 402 can, in some embodiments, be executed by a basin modeling component 314 in software application 308, and can be configured to model geological changes to a particular basin over time. Similarly, the clathrate calculation operation 404 can in some embodiments be executed by clathrate calculation component 316, and can include calculation of various clathrate concentration features as noted above at each of a plurality of data points within a particular basin model, including within a CSZ that is calculated and detected for each sequential geologic time (e.g., about 100 years to about 10 million years). Furthermore, calibration operation 406 can be configured to provide a comparison of the calculated clathrate concentrations and characteristics (e.g., porosity and permeability, level of hydrocarbons vs. other gases captured in clathrates, and other characteristics) to known or interpreted data, for example to ensure that the modeled data best matches known data in the locations where known data exists; accordingly, in locations where known data does not exist, it can be assumed that these locations are accurately described by the modeled and calculated information, since the model has been validated against the calibration data in other locations.

Referring now to FIGS. 5-6, methods are illustrated in which historical, geological modeling can be performed to produce an estimated distribution of hydrocarbons trapped in subsurface clathrates. The methods 500, 600 of FIGS. 5-6, respectively correspond generally to detailed example embodiments of the basin modeling operation 402, clathrate calculation operation 404, and calibration operation 406 of FIG. 4, above.

In the embodiment shown, method 500 of FIG. 5 includes a basin model building operation 502 for a particular geographical area of interest. The basin model can include, for example, a suite of two-dimensional or three-dimensional maps, and/or other data derived from exploration of that geographical area or from existing or past production of conventional or unconventional resources (e.g., such as gas shale, shale oil, etc.). The basin model building operation 502 can, in some embodiments, assimilate knowledge by gathering direct observation data (e.g., well logs, geochemistry, etc.) or sensed/derived data, such as from seismic or acoustic data, horizons, geomechanics, lithologies, heat flow measurements or modeling, or other effects. A basin model modification operation 504 can include deposition of a layer at the top of the model, compaction, deformation of geometry, modification of flow/seal, mechanical, and/or thermal properties of rocks or sediments included in the basin model as the rocks or sediments may change spatial position within the model between time steps due to uplift, burial or non-vertical movement. These changes can be to source rock properties, reactions, heat flow, thermal gradients, paleo water depth, boundary and initial conditions, or other effects.

The basin model modification operation 504 also corresponds to determining based on the understanding of geology of the area and how the various aspects of the basin model would change across time steps of a predetermined amount. The time steps may, in various cases, be varied, or could be adjusted using the software application 308 used to perform such modeling, but generally will be on the order of hundreds of thousands of years to tens of millions of years. Accordingly, the basin model modification operation 504 can perform a sequenced updating of a basin model, from the beginning of geological time to the present day.

As illustrated in FIG. 5, at each of these time steps, a number of computations are performed, for example by a clathrate calculation component 316 of a software application 308. In the embodiment shown, for each time step, at operation 506 a pressure and a temperature are computed for each point in three-dimensional space within the basin model. It is noted that the calculation of pressure and temperature in a present-day system is a snapshot in time, and that such temperatures and pressures will change over time due to geological evolution of an geographic area, for example due to changes in the depositional environment, water depth, deposition rate, and other corresponding characteristics. Calculation of pressure and temperature at each point within a basin model, and in particular changes in pressure over time due to compaction, tectonics, and other factors, is described, for example, in Hantschel, Th., Kauerauf, A., I., Fundamental of Basin and petroleum Systems Modeling, Springer Verlag Berlin Heidelberg, 2009, p. 31-101, the disclosure of which is hereby incorporated by reference in its entirety.

A hydrocarbon calculation operation 508 performs a computation of liquid and vapor generated within the overall model between the previous time step and the current time step. This hydrocarbon calculation operation 508 can include, for example, computing thermogenic and biogenic gas generated at various locations in the model (i.e., with thermogenic gases generally forming in much deeper system than the CSZ and migrating into the CSZ through geologic time and the biogenic gases generally forming close to the CSZ. Example calculations of generation and migration of hydrocarbon gases formed from thermogenic and biogenic processes are described, for example, in the following publications, each of which is incorporated by reference in its entirety: Rice, D. D., Claypool, G. E., Generation, Accumulation, and Resource Potential of Biogenic Gas, AAPG Bulletin, January 1981, v. 65 (at pp. 5-25); Fjellanger, E., et al., Charging the giant gas fields of the NW Siberia basin, The Geological Society of London, Petroleum Geology Conference series, 2010, v. 7 (at pp. 659-668); Hantschel, Th., Kauerauf, A., I., Fundamental of Basin and petroleum Systems Modeling, Springer Verlag Berlin Heidelberg, 2009 (at pp. 151-340). Additionally, the hydrocarbon calculation operation can account for oil to gas cracking, as discussed in Hantschel, Th., Kauerauf, A., I., Fundamental of Basin and petroleum Systems Modeling, Springer Verlag Berlin Heidelberg, 2009, p. 151-340. An operation 510 then calculates non-hydrocarbon gases, such as $CO_2$ and $H_2S$, which form by the organic or inorganic processes. Example calculations of $CO_2$, $H_2S$ formation in subsurface locations is described in further detail in a number of publications, for example in: Fleet, A. J., et al., 1998, Large volumes of carbon dioxide in sedimentary basins; Goldschmidt Conference Toulouse 1998, Mineralogical Magazine, V.62A, (at p. 460-461), the disclosure of which is hereby incorporated by reference in its entirety.

A clathrate stability zone operation 512 establishes a clathrate stability zone based on the calculated pressures and temperatures as determined during operation 506. As such, the clathrate stability zone operation 512 determines which of the biogenically or thermogenically generated gases, whether hydrocarbon gases or otherwise, are present within the CSZ. A clathrate presence determination operation 514 determines whether clathrates are present in the CSZ in the prior time step. Determination of whether clathrates are present in the CSZ can be performed, for example, based on the existence of the CSZ, transport of hydrocarbon gases through a basin model, and other generation of such gases. Example descriptions of detecting clathrate presence are provided in Kvenvolden, K. A., 1993, Gas hydrates—Geological Perspective and Global Change, Reviews of Geophysics, 31, 2, p. 173-187; and Behseresht, J., Bryant, S. L., 2011, Sedimentological and transport control on hydrate saturation distribution in Arctic gas-hydrate-bearing deposits, Proc. $7^{th}$ Int. Conf. on Gas Hydrates, ICGH, Edinburgh, July 17-21, (14p), the disclosures of which are hereby incorporated by reference in their entireties.

If clathrates were present based on the clathrate presence determination operation 514, operational flow branches "yes" to a gas release estimation operation 516, which estimates gas released from such clathrates based on modeled changes in a basin model resulting in clathrates leaving the CSZ and release of gas trapped in the clathrates. The estimated gas release can be based on volumes of clathrates that leave the CSZ, for example due to pressure or temperature changes, and using the principles discussed above relative to clathrate formation. This could be due to hydrates at deeper depths leaving the CSZ as sediments push the clathrates to deeper depths and higher temperature/pressure conditions, or based on a change due to failure of a clathrate seal or deeper seals in the CSZ. In connection with the present disclosure, the clathrate presence determination operation 514 tracks the amount and location of released gases (e.g., by calculating expansion of the gas when released from the clathrate), and the gas is added to the collection of free hydrocarbons or other gases tracked within the basin model.

Following the gas release estimation operation 516, or in the event no clathrates were present in the clathrate presence determination operation 514 (and operational flow branched "no"), a model migration process 518 tracks gas migration for existing gases within the overall model, as well as migration of new biogenic and thermogenic gases outside the CSZ. The gas migration can be based on rising of such gases through the CSZ, as affected by seals or other flow barriers within the CSZ that may trap such gases to allow for further creation of clathrates. The model migration process 518 estimates volumes, masses, saturations, and other calculations of fluids and gases within the overall model.

A clathrate generation operation 520 determines whether, based on the migrated free gas and conditions in the CSZ, additional clathrates are formed around hydrocarbon or other gases. This can be performed, for example, based on the existence of biogenically or thermogenically generated gases migrating through the CSZ, as well as a determination of whether conditions exist in the CSZ that would support formation of clathrates. This can include, for example, adequate porosity of a sediment in the CSZ to allow formation of clathrates, the permeability of that same area including sediment or clathrates, the presence of geological features (e.g., barriers) that would hold pockets of such formed gases and would support formation of hydrates, or other effects. Porosity of the sediment can be based on, for example, mechanical or chemical features of the particular sediment, as modified by any existing clathrates formed in pores between sediment grains when within the CSZ. Such calculations are provided in the above-cited Kvenvolden and Behseresht publications, which were previously incorporated by reference in their entireties.

Following operation 520, a hydrocarbon estimation operation 522 estimates locations, concentrations, and constitution of hydrocarbons trapped in hydrates. The hydrocarbon estimation operation 522 determines, based on a source of hydrocarbon gas (e.g., biogenic or thermogenic) the makeup of that gas (including portions which are hydrocarbon and portions which are not), and determines whether that gas is held in clathrates in the CSZ. Based on a modeled clathrate saturation and the clathrate constitution (i.e., the gas which is trapped in the clathrate), the volume of free gas available to be released from the clathrate is calculated. This volume can be calculated according to the Kvenvolden and Behseresht publications noted above, as well as in Lee, M. F., and Waite, Estimating pore-space gas hydrate saturations from well log acoustic data, Geochem. Geophys. Geosyst., V. 9, No. 7, 8p., which is also incorporated by reference herein in its entirety.

As illustrated in FIG. 5, each of operations 504-522 is performed iteratively for each time step between a beginning of geological time and geologic present day, such that at geologic present day a clathrate distribution, including concentration of such clathrates in particular areas within the geographical area of interest, are modeled. Additionally, at present day a volume and location of hydrocarbons trapped in such clathrates, as well as a volume and location of non-hydrocarbon gases trapped in such clathrates (e.g., $CO_2$, $H_2S$) are also modeled.

It is noted that, at the point where a present day model is developed from historical biogenic and thermogenic effects as well as various temperature/pressure, porosity/permeability, and other geological effects, that present day model requires validation against known data describing that geographical area of interest. This validation, or comparison between known and modeled data in a variety of locations within the geographical area of interest, allows for a determination or reasonable assumption that other areas in which direct observation is not available the model also accurately represents current geological state (e.g., pressure, temperature, presence and saturation of clathrates and both hydrocarbon and non-hydrocarbon gases). From the presence and saturation information regarding current-day clathrates, predicted locations of clathrate reservoirs, such as reservoirs 102, 202 can be made regarding locations where such predictions were in the past difficult to make based on a lack of observed or derived/inferred information about that particular location.

Method 600 of FIG. 6 generally is configured to receive a present day hydrocarbon and clathrate distribution, output from the method 500 of FIG. 5, and perform a number of calibration processes on that resulting data. The method 600 is used to determine whether that data represents a likely-accurate representation of current-day clathrate and hydrocarbon distributions. Accordingly, method 600 can correspond to calibration and modification processes that are performed after time step iterations over geologic time have been completed.

In the embodiment shown, the method 600 initially determines, at operation 602, whether the present day hydrocarbon and clathrate distribution represents a good fit to calibration data. In connection with the present disclosure, the calibration data can include, for example observed data from well logs in the geographic area. Accordingly, present day temperature, pressure, and observed hydrocarbon/clathrate features can be compared to those generated from the modeled calculations over geological time, to determine that temperature, pressure, and other logs are honored by the modeled calculations.

Calibration data includes but is not limited to, an interpreted bottom simulating reflector ("BSR"), clathrates identified from logs in existing, known locations, clathrate bodies identified from amplitude versus offset analysis ("AVO"), seismic inversion, or controlled-source electromagnetic ("CSEM") methods. For example, the interpreted BSR methodology uses rock formations and sediment properties to indicate a presence of a clathrate within a CSZ; such calculations and analyses can be as described in Spence, G. D., et al., 2010, Seismic Indicators of Natural Gas Hydrate and Underlying Free Gas, in: Geophysical Characterization of Gas Hydrates, eds: Riedel, M, Willoughby, E. C., Chopra, S., SEG Geophysical Developments, No. 14, p. 39-71, the disclosure of which is hereby incorporated by reference. Additionally, identification of clathrates based on borehole logs is described in numerous publications, including Goldberg, D. S., 2010, Evaluation of Natural Gas-hydrate Systems Using Borehole Logs, in: Geophysical Characterization of Gas Hydrates, eds: Riedel, M, Willoughby, E. C., Chopra, S., SEG Geophysical Developments, No. 14, 239-261; Lee, M. F., and Waite, Estimating pore-space gas hydrate saturations from well log acoustic data, Geochem. Geophys. Geosyst., V. 9, No. 7, 8p.; Kleinberg, R. L., et al., Magnetic resonance log of JAPEX/JNOC/GSC et al. Mallik 5L-38 gas hydrate production research well: Gas Hydrate Saturation, growth habit, relative permeability, in: Scientific Results From Mallik 2002 Gas Hydrate Production Research Well program, Makenzie Delta, Northwest Territories, Canada, eds: Dallimore, S. R., and Collett, Bull. Geol. Surv. Can., 585, 10p. Each of these references is also incorporated by reference.

Similarly, amplitude versus offset analysis can be performed by applying a non-linear inversion to estimate marginal probability distributions of physical parameters at an interface with a bottom simulating reflection. Such distributions can relate to overlying gas-hydrate formations and underlying free-gas concentrations by way of modeling of rock formations. Such analyses are as described in Chen, M-A., P., et al., 2010, Seismic AVO for gas-hydrate-related Reflections, in: Geophysical Characterization of Gas Hydrates, eds: Riedel, M, Willoughby, E. C., Chopra, S., SEG Geophysical Developments, No. 14, p. 73-93, the disclosure of which is also incorporated by reference. Similar seismic inversion techniques are also described in Riedel, M, et al., 2010, Inversion of Seismic Data for Elastic parameters: A Tool for Gas-hydrate Characterization, in: Geophysical Characterization of Gas Hydrates, eds: Riedel, M, Willoughby, E. C., Chopra, S., SEG Geophysical Developments, No. 14, p. 109-120, which is also incorporated by reference herein.

Furthermore, marine CSEM techniques can be used to detect resistivity of sediment layers; in general, the presence of clathrates will increase the resistivity of a sediment layer, since they reduce the passage of conductive fluids through sediment pore spaces. Details regarding such CSEM methods are discussed in Edwards, R. N., 2010, Marine Controlled-source Electromagnetics and the Assessment of Seafloor Gas Hydrate, in: Geophysical Characterization of Gas Hydrates, eds: Riedel, M, Willoughby, E. C., Chopra, S., SEG Geophysical Developments, No. 14, p. 149-162, the disclosure of which is incorporated herein by reference.

If the model calibrates well to the calibration data, operational flow branches "yes" and proceeds to determine at operation 604 if other indicators of clathrates are available. Other indicators can include, for example seismic or acoustic logs, or other "soft" or estimated clathrate presence data from other sources. If such data are present, operation 606 compares the modeled calculations to that "soft" data to determine if a good fit exists. This can include, for example, a comparison of predicted clathrate accumulations (e.g., 2D/3D objects, saturation, or other qualitative or quantitative representations of clathrates) to seismic and/or other indicators.

If a good fit to that data also exists, the overall system of FIGS. 5-6 has generated and validated a model of clathrate formation over time that includes biogenic and thermogenic gases, and further includes migration of those gases through a CSZ over time. Accordingly, operational flow branches "yes" from operation 606 to an output operation 608, which can output one or more types of data. For example, the output operation 608 can output an independent indication (from other types of observation data) of whether clathrates exist at the present day in particular locations within the geographical area of interest and which is the subject of the basin model. The output operation 608 could also output an independent indication of a percentage saturation of clathrates in a present day clathrate stability zone. The output operation 608 could still further output an independent indication of specific types of gas (e.g., methane, $CO_2$, or other gases) and associated volumes in the CSZ, for example based on the modeled type of formation of those gases (thermogenic or biogenic) and the known proportions of gases generated from each type of process.

If, based on the calibration assessment of operation 602 or comparison to "soft" data in operation 606, that there is a bad match between the modeled data and other observations, operational flow branches "no" from those operations to operation 610, at which the basin model is modified. This modification can include modifications to heat flow characteristics, thermal gradients across depths, rock properties, or other characteristics that would better fit the calibration data. Once the calibration data is a better fit, output operation 608 as discussed above would ultimately be reached.

Referring to FIGS. 1-6 overall, it is noted that the combination of historical basin modeling with a complete tracking of sources of hydrocarbon formation allows for more accurate tracking of clathrate formations, and can more accurately detect "sweet spots" where clathrate harvesting may prove economical. Additionally, by tracking non-hydrocarbon gases generated by those same processes, "false positive" clathrate formations can also be detected, in which non-hydrocarbon gases may instead be captured in clathrates. Furthermore, the methods and systems of FIGS. 1-6 provide a mechanism by which an overall picture of clathrate formation can be generated, and can be validated by comparison to a narrower data set of well logs or other localized information, thereby providing independent information regarding other locations in the same geographical area without needing further well logs or seismic exploration.

Embodiments of the present disclosure can be implemented as a computer process (method), a computing system, or as an article of manufacture, such as a computer program product or computer readable media. The term computer readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing system 300, above. Computer storage media does not include a carrier wave or other propagated or modulated data signal.

The computer program product may be a computer storage media readable by a computer system and encoding a computer program of instructions for executing a computer process. Accordingly, embodiments of the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media. Further, the disclosed methods' stages may be modified in any manner, including by reordering stages and/or inserting or deleting stages, without departing from the overall concept of the present disclosure.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A computer-implemented method for historical, geological modeling for producing an estimated distribution of hydrocarbons trapped in subsurface clathrates, the method comprising:
   instantiating, on a computing system, a basin model of a geological area of interest;
   for each of a plurality of predetermined geological times up to a geologic present day, performing, via the computing system a plurality of computer-implemented processes including:
      determining one or more changes to the basin model;
      calculating, at each of a plurality of locations within the basin model, a temperature and a pressure;
      determining an existence and a location of a clathrate stability zone based on the calculated temperatures and pressures; and
      estimating one or more clathrate concentrations and hydrocarbon volumes in the clathrate stability zone;
   calibrating, on the computing system, a present day clathrate concentration and hydrocarbon volume derived from the basin model against calibration data obtained from one or more locations within the geological area of interest, thereby providing a model of the present day clathrate concentration and hydrocarbon volume at each of the plurality of locations; and
   modifying the model of the present day clathrate concentration and hydrocarbon volume to improve a correspondence between the model and the calibration data.

2. The method of claim 1, wherein estimating the clathrate concentrations and hydrocarbon volumes in the clathrate stability zone at each of the plurality of predetermined geological times up to the geologic present day includes modeling biogenic and thermogenic hydrocarbons generated during each of the plurality of predetermined geological times.

3. The method of claim 2, wherein modeling the biogenic and thermogenic hydrocarbons generated during each of the plurality of predetermined geological times includes modeling formation of one or more non-hydrocarbon gases formed from biogenic and thermogenic processes that form the biogenic and thermogenic hydrocarbons.

4. The method of claim 1, wherein the calibration data includes observed well log pressure and clathrate saturation data.

5. The method of claim 1, wherein the calibration data includes interpreted data including at least one of seismic reflection data and acoustic signal reflection data.

6. The method of claim 1, wherein the one or more changes to the basin model include one or more of burial and uplift.

7. The method of claim 1, wherein the method further includes, for each of a plurality of predetermined geological times up to the geologic present day, determining a porosity and a permeability at each of the plurality of locations within the basin model.

8. The method of claim 7, wherein each of the plurality of locations within the basin model are within a geological present clathrate stability zone.

9. The method of claim 7, wherein the porosity is based on one or more mechanical and chemical properties of sediment at each of the plurality of locations within the basin model as well as existing clathrates formed within a clathrate stability zone at a prior geological time.

10. The method of claim 1, wherein estimating the one or more clathrate concentrations includes calculating a clathrate saturation level at one or more locations within a clathrate stability zone, the clathrate saturation level based at least in part on a porosity and a permeability of a combination of sediment and clathrates formed at a location within the clathrate stability zone.

11. The method of claim 1, wherein estimating the one or more clathrate concentrations and hydrocarbon volumes in the clathrate stability zone includes estimating migration of free gas released in a prior geological time period based on migration of sediment including clathrates from within a clathrate stability zone at the prior geological time period to a location outside the clathrate stability zone.

12. The method of claim 1, wherein estimating the one or more clathrate concentrations and hydrocarbon volumes in the clathrate stability zone includes modeling a barrier effect provided by existing clathrates within the clathrate stability zone at a current predetermined geological time, thereby preventing migration of free gas upward through the clathrate stability zone.

13. The method of claim 1, wherein, for each of the plurality of predetermined geological times, the method further includes computing an existence of non-hydrocarbon gases held in clathrates in the clathrate stability zone.

14. The method of claim 1, wherein the method further includes outputting an independent indication of an existence of clathrates at one or more locations within the geological area of interest at the geologic present day.

15. The method of claim 1, wherein the method further includes outputting an independent indication of a saturation percentage of clathrates at one or more locations within the geological area of interest at the geologic present day.

16. The method of claim 1, wherein the method further includes outputting an independent indication of a presence of one or more non-hydrocarbon gases at one or more locations within the geological area of interest at the geologic present day.

17. A system for historical, geological modeling for producing an estimated distribution of hydrocarbons trapped in subsurface clathrates, the system including:
   a computing system comprising a programmable circuit and a memory storing computer-executable instructions forming a clathrate presence and saturation determination application which, when executed, cause the computing system to:
   model one or more changes to a geological area of interest at each of a plurality of predetermined geological times up to a geologic present day in a basin model;
   for each of the plurality of predetermined geological times:
      calculate, at each of a plurality of locations within the basin model, a temperature and a pressure;
      determine an existence and a location of a clathrate stability zone based on the calculated temperatures and pressures; and estimate one or more clathrate concentrations and hydrocarbon volumes in the clathrate stability zone;

calibrate a present day clathrate concentration and hydrocarbon volume derived from the basin model against calibration data obtained from one or more locations within the geological area of interest, thereby providing a model of the present day clathrate concentration and hydrocarbon volume at each of the plurality of locations; and modify the model of the present day clathrate concentration and hydrocarbon volume to improve a correspondence between the model and the calibration data.

18. The system of claim 17, wherein the basin model comprises a suite of three-dimensional maps defining an assimilation of known information about a geographical area.

19. A computer-readable storage medium comprising computer-executable instructions stored thereon which, when executed by a computing system, cause the computing system to perform a method of historical, geological modeling for producing an estimated distribution of hydrocarbons trapped in subsurface clathrates, the method comprising:

instantiating a basin model of a geological area of interest, the basin model including a suite of three-dimensional maps defining an assimilation of known information about a geographical region;

for each of a plurality of predetermined geological times up to a geologic present day:

determining one or more changes to the basin model;

calculating, at each of a plurality of locations within the basin model, a temperature and a pressure;

determining an existence and a location of a clathrate stability zone based on the calculated temperatures and pressures;

estimating one or more clathrate concentrations and hydrocarbon volumes in the clathrate stability zone; and computing an existence of non-hydrocarbon gases held in clathrates in the clathrate stability zone;

calibrating a present day clathrate concentration and hydrocarbon volume derived from the basin model against calibration data obtained from one or more locations within the geological area of interest, thereby providing a model of the present day clathrate concentration and hydrocarbon volume at each of the plurality of locations;

modifying the model of the present day clathrate concentration and hydrocarbon volume to improve a correspondence between the model and the calibration data; and outputting an independent indication of an existence and saturation percentage of clathrates at one or more locations within the geological area of interest at geologic present day.

* * * * *